Sept. 8, 1959 S. H. RAYNER 2,902,816
GRAIN COMBINE WITH DRYER IN STORAGE BIN
Filed March 17, 1958 2 Sheets-Sheet 1
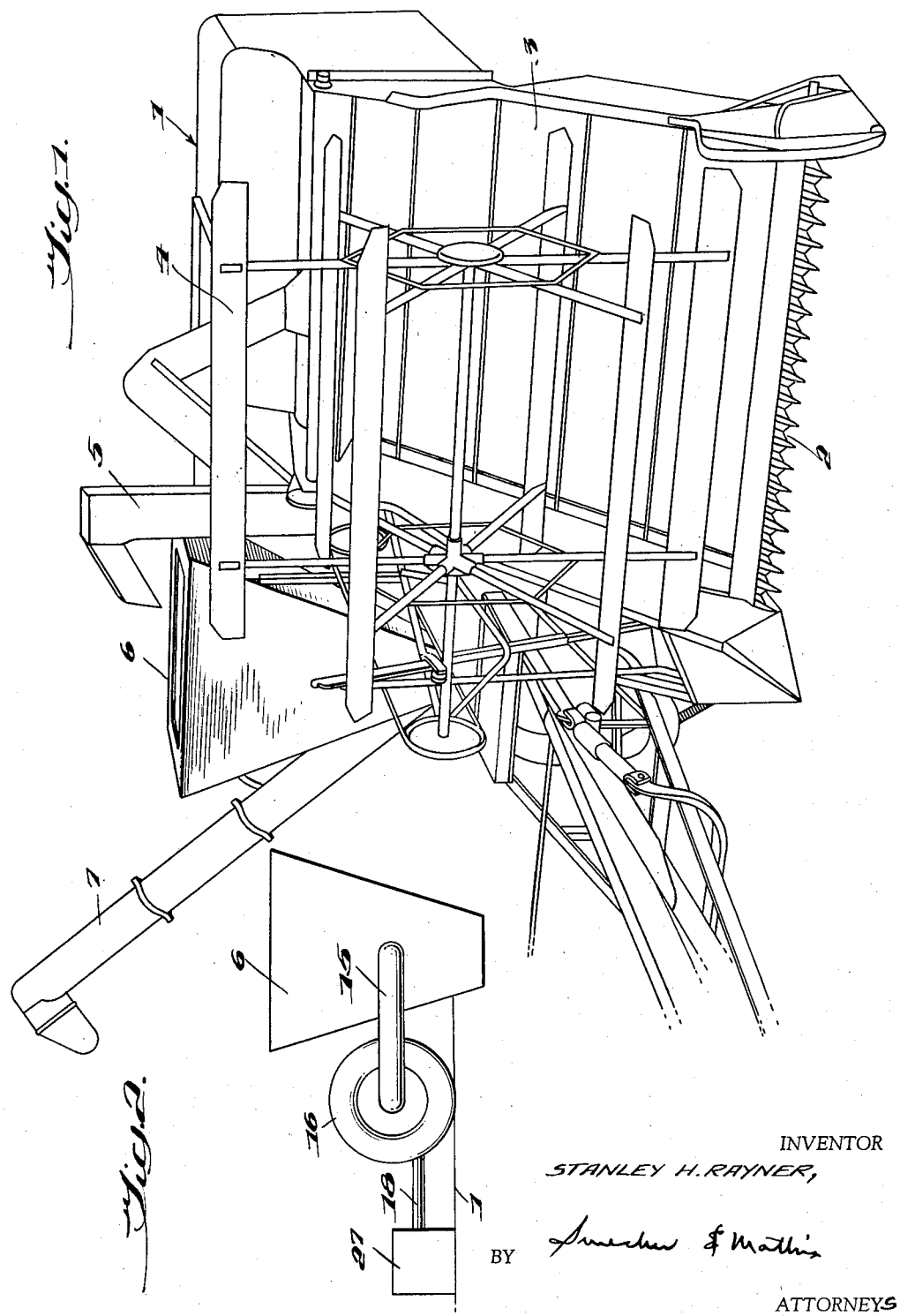
INVENTOR
STANLEY H. RAYNER,
BY
ATTORNEYS Sept. 8, 1959   S. H. RAYNER   2,902,816
GRAIN COMBINE WITH DRYER IN STORAGE BIN
Filed March 17, 1958   2 Sheets-Sheet 2
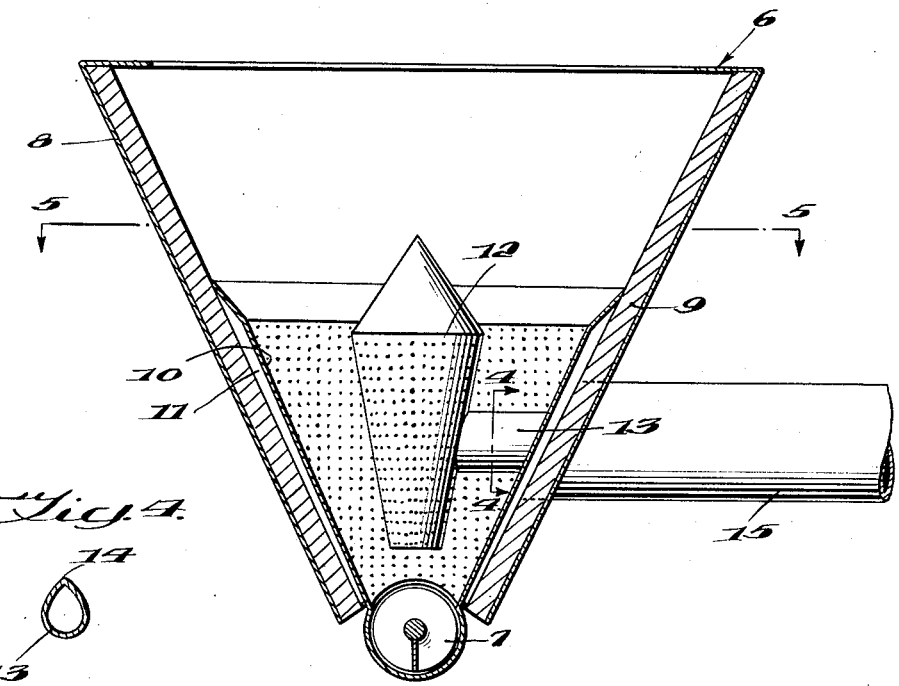
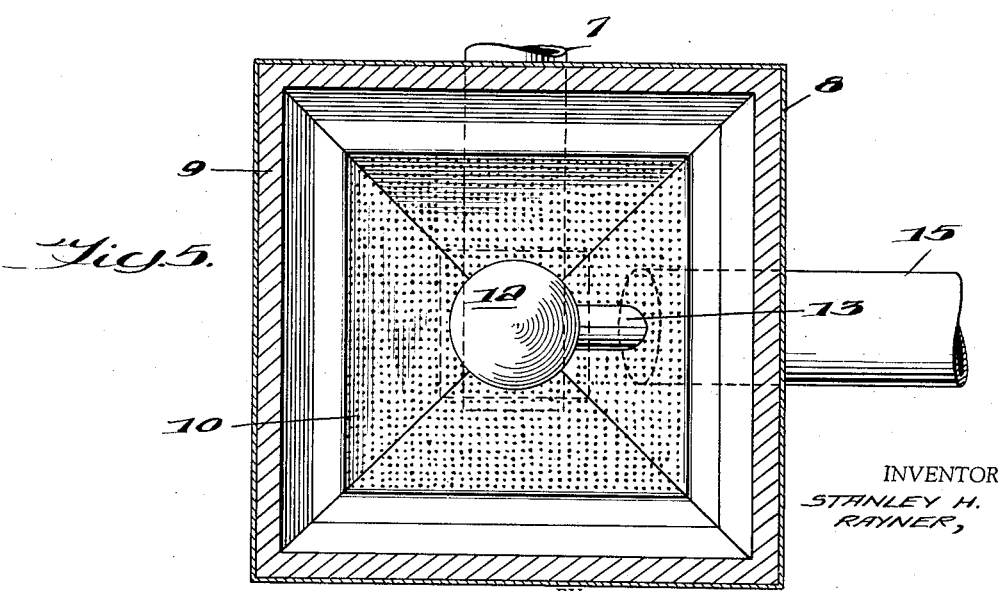
INVENTOR
STANLEY H. RAYNER,
BY
ATTORNEYS

United States Patent Office 2,902,816
Patented Sept. 8, 1959

2,902,816

GRAIN COMBINE WITH DRYER IN STORAGE BIN

Stanley H. Rayner, Salisbury, Md.

Application March 17, 1958, Serial No. 722,073

5 Claims. (Cl. 56—473.5)

This invention relates to improvements in grain combines and more particularly to harvesters for small grains, which cut and thrash the small grains, separating the grain from the stalks and chaff thereof. It is applicable particularly to such combines as are used for harvesting small grains of the character of wheat, barley, oats, sorghum, etc., where the grains must be separated from the stalks and chaff and removed to a point of storage.

The major portion of small grains is harvested now by combines or all-crop harvesters. Frequently, in a period of wet or damp weather, much difficulty is experienced in the harvesting of the grain, due to a lack of sufficient drying for effective storage. Usually, small grains must be dried to a predetermined moisture content, usually about 14% for wheat, for example, and if the moisture at the time of harvesting is appreciably higher than that percentage, storage is difficult and the farmer receives an appreciable reduction in the rate of pay for the grain harvested. In a period of wet or damp weather, when the grain reaches the stage of maturity, it should be harvested to avoid losses, even though the moisture content thereof is higher than permitted for effective storage.

This has been a problem long existing with the harvesting of crops by combines and like machinery, but no satisfactory solution has been found to overcome the difficulties and objections.

Attempts have been made to correct for excessively high moisture content of harvested grains by installing drying equipment in bins and tanks. Such equipment makes necessary the removal of the grain from the combine to the drying equipment, after which it must be handled again in removing the grain from the drying equipment to the storage bins. Where the grain is stored in elevators, which is true of a very large percentage of it, this extra handling not only results in losses due to wastage, but it involves a very major expense in added handling costs. Moreover, it increases appreciably the expense of installing and maintaining the drying equipment.

One object of this invention is to satisfy the long-felt want in harvesting small grain with a combine and assuring that the same will be in satisfactory condition for storage.

Another object of the invention is to improve the construction of combines or harvesters, especially for small grains, by providing for the effective drying of the grains during the period of time that the same are in the combine or harvester, so as to deliver effectively dry grain therefrom.

Still another object of the invention is to provide an effective drying unit for a combine or harvester which will apply a drying action to the grain during the transportation thereof in the combine or harvester to the point of discharge therefrom.

These objects are accomplished, according to one embodiment of the invention, by providing a grain bin which receives the grain from the harvester and has provision for heating the grain as contained therein during the harvesting operation, so as to deliver effectively dried grain at the point of discharge into a transport vehicle. A grain bin suitable for this purpose should have provision for directing a stream of heated air into and through the grain contained in the bin, so as to insure of uniform drying thereof and the delivery of effectively dried grain from the bin. I prefer to have the bin effectively insulated and to provide a screen lining in the bin, spaced from the wall thereof sufficiently for freedom of circulation of heated air through the grain. Then, as the volume of grain falls from the elevator into the bin, it will be heated effectively and dried both by the heat and by the circulation of air therethrough, whereby effectively dried grain will be delivered from the bin when the combine reaches the point of discharge into a transport vehicle.

This embodiment of the invention is illustrated in the accompanying drawings, in which:

Fig. 1 is a perspective view, showing a combine to which the invention may be applied;

Fig. 2 is a partial side elevation illustrating the heater unit and the bin;

Fig. 3 is an enlarged cross section through the grain bin;

Fig. 4 is a detail cross section through an air circulating pipe, on the line 4—4 in Fig. 3; and Fig. 5 is a horizontal section through the grain bin on the line 5—5 in Fig. 3.

The invention may be applied to any suitable or desired form of combine or harvester, especially for small grains, such, for example, as those having grain bins adapted to receive and contain the grain during a portion of the travel of the machine over the fields. It is customary practice, with a combine of this type, to provide a grain bin of substantial capacity, so as to receive and contain the harvested grain, as the machine travels about the field, and from which the grain can be discharged, usually at a single point, into a suitable transport vehicle.

A conventional form of combine is illustrated generally by the numeral 1, having sickle bar cutter mechanism 2 at the front thereof for severing the stalks of grain, which are then transported up into and through the machine on an apron 3 under the influence of a reel 4. The thrashing mechanism of the combine 1 is not illustrated in detail since this forms no part of the present invention and since the invention may be applied to any suitable or desired form of harvesting equipment.

After the grain is separated in the thrashing mechanism from the stalks and chaff, it is directed upwardly through an elevator, generally indicated at 5, which discharged the grain into a grain bin, generally indicated at 6. The grain bin 6 is usually of sufficient capacity so as to receive and contain a substantial quantity of grain. Usually, the machine will travel over a substantial portion of the field before the grain is discharged from the bin.

The grain falls from the elevator 5 into and through the bin 6. A conveyor is shown at 7 extending transversely of the bottom of the bin 6 and upwardly relative thereto, for delivering the grain from the bin 6 into a transport vehicle Usually, the conveyor 7 is sufficiently flexible so that its outer end portion may be raised and lowered to position the same over the body of the vehicle.

The grain bin 6 may be of any suitable size, shape and capacity, as desired. According to this invention, it is so constructed as to apply an effective drying action to the grain contained in the bin during the movement of the combine or harvester over a substantial portion of the field in the cutting operation. Accordingly, the bin is formed with an upright enclosed body, indicated generally at 8, having a substantial opening in the top thereof and having the bottom thereof closed by the conveyor 7 extending transversely thereof. It is preferred that the body 8 be completely lined on the inside by heat insulation, indicated generally at 9. Such insulation may be applied to a conventional grain tank or other suitable construction provided for the purpose.

Spaced from the inner face of the body 8 or the lining 9, if the latter be used, is a surrounding shield 10 which extends upwardly from the periphery of the conveyor 7 throughout a substantial portion of the height of the tank. The shield 10 is spaced so as to allow an air circulating space between said shield and the inner face of the body of the tank, as indicated generally at 11, and has perforations therein for freedom of passage of air from the space 11 into and through the grain that is confined by the shield 10. The perforations should be sufficiently small, however, so as not to permit of passage of the grain into and through the perforations, nor to clog the openings thereof.

A conical air chamber is provided preferably at 12 in the center of the grain bin 6, supported by a tube 13 that extends from one side of the air chamber 12 to the adjacent portion of the shield 10. The tube 13 has a downwardly tapered upper edge portion, indicated at 14, to shed freely the grain passing downward therearound and to prevent clogging or accumulation of grain thereover. The chamber 12, like the shield 10, is perforated for passage of the heated air therethrough into and through the grain contained in the bin.

Air is supplied to the air space 11 and from the latter to the air chamber 12 through a duct 15 that is in open communication at its inner end with the air space 11 and extends laterally from the bin 6 to a suitable source of heated air under pressure, as, for example, to a heater-blower illustrated at 16 in Fig. 2. Any suitable or desired form of heat may be used for the purpose, either an electrically heated and driven fan or a source of hot air from a burner which may be supplied with fuel from a tank 27 on the combine 1, through a fuel duct 18, as indicated generally in Fig. 2.

The combine or harvester operates in conventional manner to cut and thrash the grain and to deliver the same through the elevator 5 into the grain bin 6. The latter is of sufficient capacity so as to provide for retaining of the grain in the bin during travel of the combine or harvester over a substantial portion of the field between discharging of the grain at successive intervals into transport vehicles. This will permit the grain to be retained in the bin 6 long enough to be dried effectively if it should contain an excessive quantity of moisture, so as to make unnecessary subsequent drying operations and to insure that the grain will be effectively dried for storage when delivered from the combine.

A continuous supply of heated air preferably is directed from the heater or blower 16 through the pipe 15 into and through the air space 11, preferably entirely around the walls of the bin 6. This heated air will be directed from the air space 11 through the perforations in the shield 10 into the body of grain contained in the lower portion of the bin, as well as through the tube 13 into and through the air chamber 12, which discharges this heated air into the center portion of the body of grain contained in the lower portion of the bin 6. Thus, the capacity of the grain bin may be made sufficiently large to accommodate a substantial quantity of grain without interfering with the effective drying of the grain therein, even in the center portion thereof.

When the combine or harvester reaches the point of discharge into a transport vehicle, the conveyor 7 can be lowered over the vehicle and operated to transfer the heated and dried grain in the lower portion of the bin into the vehicle. If the attendant should find that insufficient drying has been accomplished with respect to the grain in the upper portion of the bin, the grain last discharged therein, he can stop the operation of the conveyor at such point so as to retain the insufficiently dried grain in the lower portion of the grain bin for further drying as the combine makes another harvesting passage. Therefore, if necessary, according to the condition of the grain, an effective drying of that portion thereof which is removed from the combine will insure that the grain thus delivered to the transport vehicles directly from the combine or harvester is in condition for storage. This drying operation is accomplished simultaneously with the harvesting and thrashing operations and without any appreciable increase in cost of equipment. Not only does it save that added expense, but an appreciable saving in time is accomplished, since the grain removed from the combine or harvester can be transported directly to an elevator or storage point, even though the grain, when initially cut, contained excessive moisture, so as to prevent storage at that time. This is a result long sought in the art, but has not been accomplished effectively heretofore.

While the invention has been illustrated and described in one embodiment, modifications and changes may be made therein without departing from the invention as set forth in the claims.

I claim:

1. A drying bin for use on harvesters and the like, said bin having side wall means, and a bottom having discharging means associated therewith, a perforated liner shield in said bin spaced from said side wall means, and hot air conduit means extending through said wall means and into communication with the space defined by said shield and said side wall means.

2. A drying bin for use on harvesters and the like, said bin having side wall means, and a bottom having discharging means associated therewith, a perforated liner shield in said bin spaced from said side wall means, hot air conduit means extending through said wall means and into communication with the space defined by said shield and said side wall means, and means defining a perforated chamber in said bin and an air conduit interconnecting the same with said space defined by said liner shield and said side wall means.

3. In a grain combine or harvester, a drying bin adapted to receive thrashed grain during operation of the combine or harvester and to retain the grain therein during a substantial portion of the operation of the combine or harvester, said bin having side wall means, and a bottom having discharging means associated therewith, a perforated liner shield in said bin spaced from said side wall means, and hot air conduit means extending through said wall means and into communication with the space defined by said shield and said side wall means.

4. In a grain combine or harvester, a drying bin adapted to receive thrashed grain during operation of the combine or harvester and to retain the grain therein during a substantial portion of the operation of the combine or harvester, said bin having side wall means, and a bottom having discharging means associated therewith, a perforated liner shield in said bin spaced from said side wall means, hot air conduit means extending through said wall means and into communication with the space defined by said shield and said side wall means, and means for supplying heated air to said hot air conduit means for effecting substantially drying action of the grain as the grain is retained in the drying bin during operation of the combine or harvester.

5. In a grain combine or harvester, a drying bin adapted to receive thrashed grain during operation of the combine or harvester and to retain the grain therein during a substantial portion of the operation of the combine or harvester, said bin having side wall means, and a bottom having discharging means associated therewith, a perforated liner shield in said bin spaced from said side walls means, hot air conduit means extending through said wall means and into communication with the space defined by said shield and said side wall means, and means on the combine or harvester and connected with hot air conduit means for supplying heated air through said conduit means to the interior of the drying bin during operation of the combine for effecting artificial drying of the grain in the bin.

References Cited in the file of this patent

UNITED STATES PATENTS

| | | |
|---|---|---|
| 1,041,523 | Smith | Oct. 15, 1912 |
| 2,706,345 | Arndt | Apr. 19, 1955 |

FOREIGN PATENTS

| | | |
|---|---|---|
| 506,319 | Belgium | Oct. 31, 1951 |
| 696,228 | Great Britain | Aug. 26, 1953 |